United States Patent
Kang

(10) Patent No.: US 9,342,198 B2
(45) Date of Patent: May 17, 2016

(54) METHOD FOR OPERATING ELECTRONIC DEVICE BASED ON TOUCH PRESSURE AND THE DEVICE PERFORMING THE METHOD

(71) Applicant: Samsung Electronics Co. Ltd., Suwon-si, Gyeonggi-do (KR)

(72) Inventor: Taejin Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 14/025,126

(22) Filed: Sep. 12, 2013

(65) Prior Publication Data

US 2014/0071077 A1    Mar. 13, 2014

(30) Foreign Application Priority Data

Sep. 13, 2012  (KR) .................... 10-2012-0101454

(51) Int. Cl.
*G06F 3/044*    (2006.01)
*G06F 3/0488*   (2013.01)
*G06F 3/041*    (2006.01)

(52) U.S. Cl.
CPC .............. *G06F 3/044* (2013.01); *G06F 3/0416* (2013.01); *G06F 3/0488* (2013.01)

(58) Field of Classification Search
CPC ............................................ G06F 3/041–3/047
See application file for complete search history.

(56) References Cited

U.S. PATENT DOCUMENTS

| | | | | |
|---|---|---|---|---|
| 6,747,636 B2* | 6/2004 | Martin | ................ | G03B 21/132 178/18.03 |
| 8,106,787 B2* | 1/2012 | Nurmi | .................. | G06F 3/0414 340/540 |
| 8,286,102 B1* | 10/2012 | Wilensky | ...................... | 715/863 |
| 8,363,020 B2* | 1/2013 | Li | ......................... | G06F 3/0414 345/104 |
| 8,625,882 B2* | 1/2014 | Backlund | ............ | G06F 3/04815 345/419 |
| 9,063,625 B2* | 6/2015 | Hiroyuki | ................ | G06F 3/044 |
| 2010/0123592 A1* | 5/2010 | Nurmi | .................. | G06F 3/0414 340/665 |
| 2010/0283740 A1* | 11/2010 | Chao | ........................... | 345/173 |
| 2010/0328053 A1* | 12/2010 | Yeh | ........................ | G06F 3/041 340/407.2 |
| 2011/0050588 A1* | 3/2011 | Li | ........................ | G06F 3/0414 345/173 |
| 2012/0057806 A1* | 3/2012 | Backlund | ............. | G06F 3/0488 382/286 |
| 2012/0098783 A1* | 4/2012 | Badaye | ................... | G06F 3/044 345/174 |
| 2012/0105358 A1* | 5/2012 | Momeyer | ............. | G06F 3/0414 345/174 |
| 2012/0242617 A1* | 9/2012 | Lee | .............................. | 345/174 |
| 2012/0313860 A1* | 12/2012 | Hashimura et al. | ........... | 345/173 |
| 2014/0009434 A1* | 1/2014 | Hiroyuki | ................ | G06F 3/044 345/174 |
| 2014/0146070 A1* | 5/2014 | Liu | ........................ | G09G 5/003 345/589 |
| 2014/0320437 A1* | 10/2014 | Kang | ..................... | G09G 5/373 345/173 |

* cited by examiner

*Primary Examiner* — Gene W Lee
(74) *Attorney, Agent, or Firm* — Jefferson IP Law, LLP

(57) ABSTRACT

Electronic device operating technology based on touch pressure is provided. A method for operating an electronic device includes determining touch pressure caused by a touch occurring on a display unit, comparing the touch pressure with predefined damage data, and performing a predefined specific process when the touch pressure is determined as abnormal touch pressure as a result of the comparison.

16 Claims, 7 Drawing Sheets

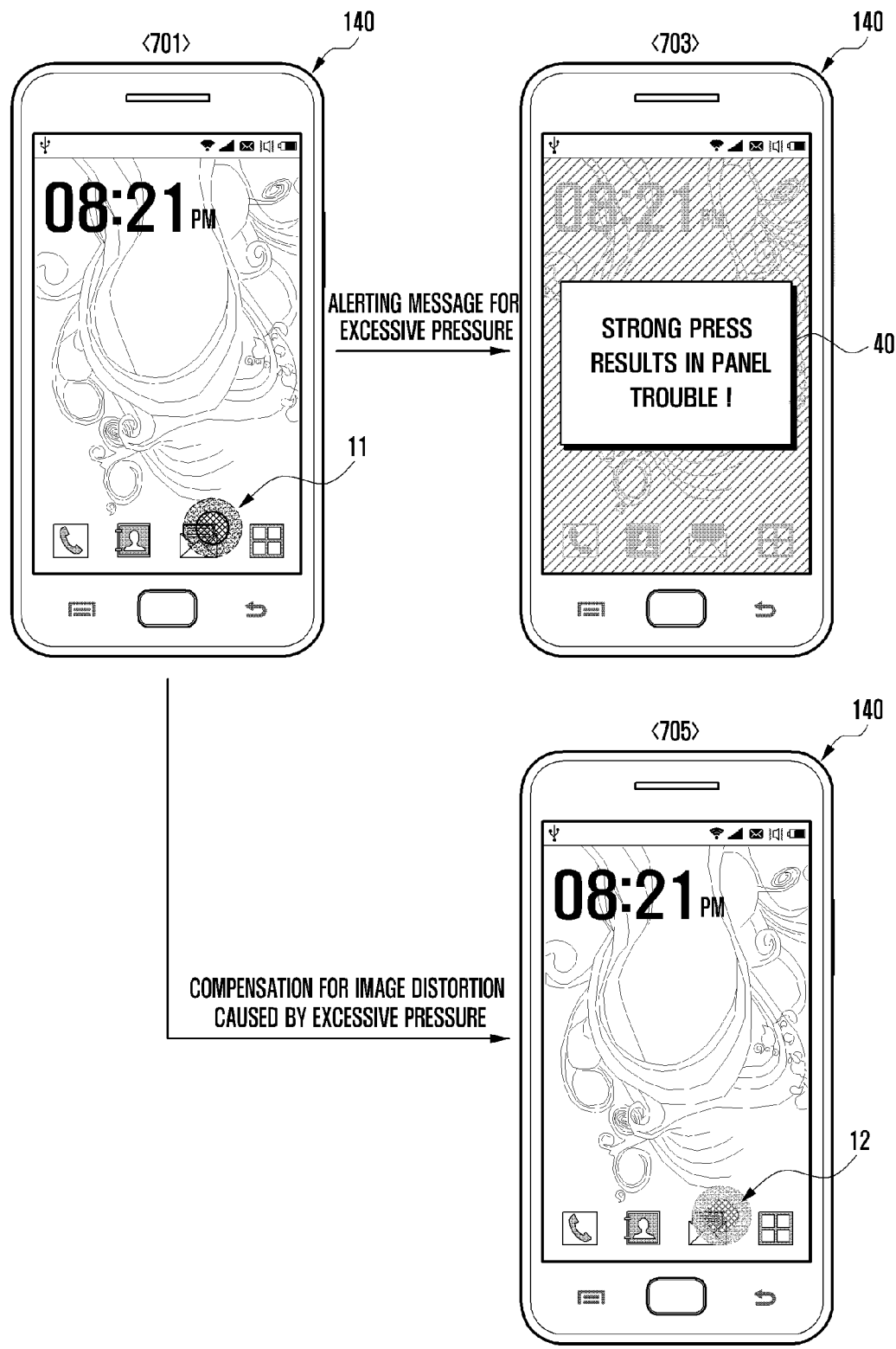

METHOD FOR OPERATING ELECTRONIC DEVICE BASED ON TOUCH PRESSURE AND THE DEVICE PERFORMING THE METHOD

CROSS-REFERENCE TO RELATED APPLICATION(S)

This application claims the benefit under 35 U.S.C. §119 (a) of a Korean patent application filed on Sep. 13, 2012 in the Korean Intellectual Property Office and assigned Serial No. 10-2012-0101454, the entire disclosure of which is hereby incorporated by reference.

TECHNICAL FIELD

The present disclosure relates to electronic device operating technology based on touch pressure. More particularly, the present disclosure relates to compensation in displaying distorted images that occur on a display panel of an electronic device.

BACKGROUND

With a remarkable growth of related technologies for use with mobile devices, a great variety of mobile devices, e.g., smart phones or tablet PCs, are becoming increasingly popular due to their high usability and portability. Particularly, mobile devices today outgrow their respective traditional electronic devices and hence a single mobile device has the ability to support various user functions traditionally limited to only large electronic devices.

In typical mobile devices, an input unit such as a keypad or key buttons is provided at a certain region separated from a display panel, so that a user of the mobile device may have no need to press or manipulate the display panel. Therefore, distortion of images displayed on the display panel hardly ever occurs unless the display panel itself has a problem.

However, most new mobile devices use a touch screen combined with the display panel. A user who desires to manipulate the mobile device can touch the surface of the display panel. However, applying too much pressure to the panel by a user's touch may exert excessive pressure on a particular spot of the display panel, and this may cause the distortion of images being displayed at the particular spot. Especially in case of the display panel having liquid crystal material therein, an unfavorable phenomenon such as the spread of color or discoloration may appear at a pressed spot due to variations in the concentration of liquid crystals or the like. Moreover, with a growing tendency toward a slim display panel, such an unfavorable phenomenon may frequently occur even in response to small pressure. Although this unfavorable phenomenon disappears by the restoration of liquid crystals to their respective locations after a certain time, the abnormal distortion of displayed images remains until the restoration of the liquid crystals to their respective locations.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to compensate for the distortion of images caused by excessive touch pressure on a display panel and hence to offer a clear screen to a user.

Another aspect of the present disclosure is to warn of excessive touch pressure and hence to reduce a possibility that an unfavorable phenomenon such as the spread of color or the discoloration will occur or a display panel has a problem.

According to one aspect of the present disclosure, a method for operating an electronic device based on touch pressure is provided. The method includes determining touch pressure caused by a touch occurring on a display unit, comparing the touch pressure with predefined damage data, and performing a predefined specific process when the touch pressure is determined as abnormal touch pressure as a result of the comparison.

According to another aspect of the present disclosure, an electronic device for supporting the operation based on touch pressure is provided. The device includes a display unit configured to determine touch pressure caused by a touch, a memory unit configured to store predefined damage data to be used for determining whether the touch pressure is abnormal touch pressure, and a control unit configured to perform a predefined specific process when the touch pressure is determined as abnormal touch pressure.

According to aspects of this present disclosure, by compensating for the distortion of images caused by excessive touch pressure, a screen recognition rate is improved and an electronic device can be easily manipulated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 shows screenshots illustrating the operation of an electronic device based on touch pressure according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present disclosure. Although the drawings represent various embodiments of the disclosure, the drawings are not necessarily to scale and certain features may be exaggerated or omitted in order to better illustrate and explain the present disclosure.

Figure 1:
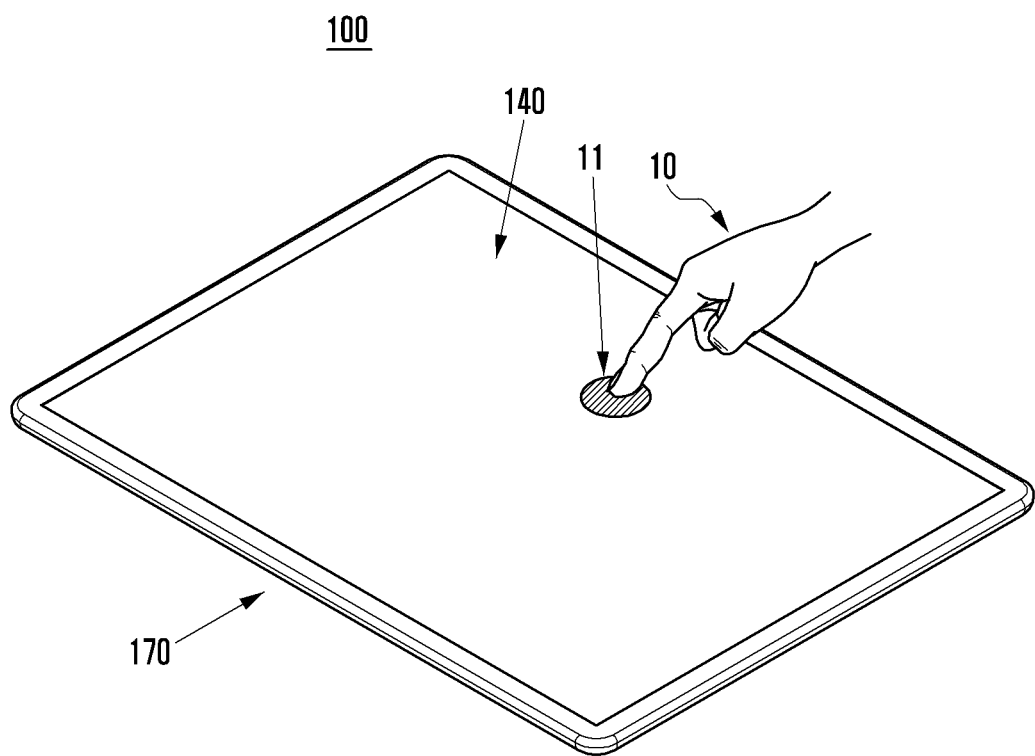
FIG. 1 is a perspective view schematically illustrating an external appearance of an electronic device according to an embodiment of the present disclosure.
Figure 2:
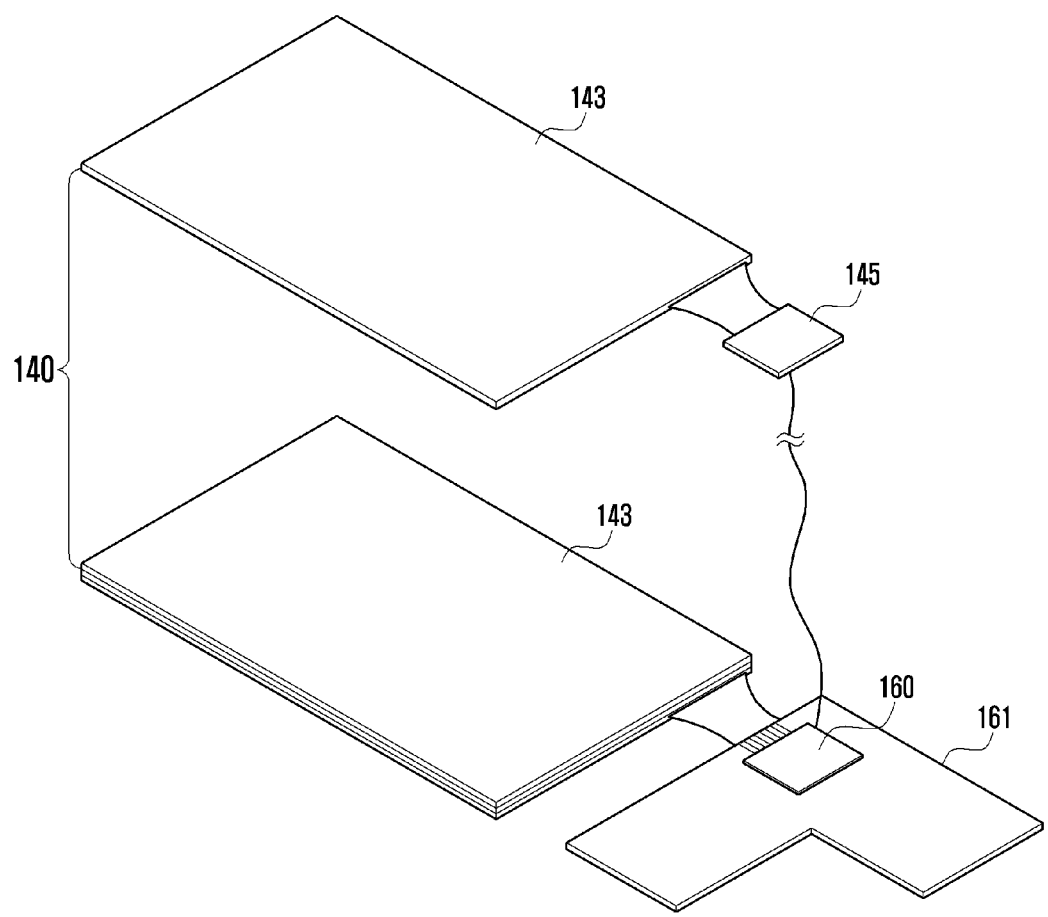
FIG. 2 is an exploded perspective view schematically illustrating a display unit and a control unit shown in FIG. 1 and related elements according to an embodiment of the present disclosure.
Figure 3:
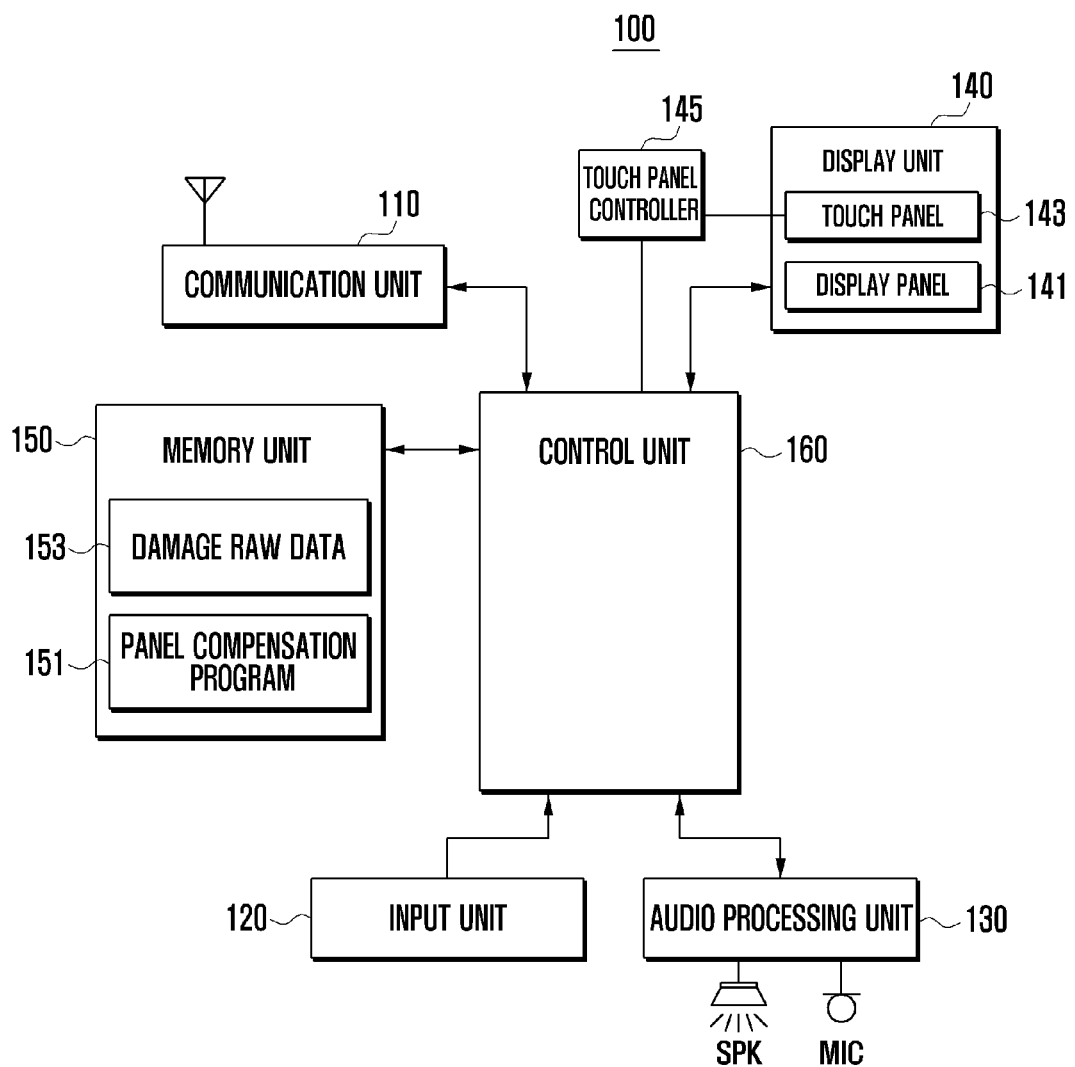
FIG. 3 is a block diagram illustrating a configuration of an electronic device according to an embodiment of the present disclosure.
Figure 4:
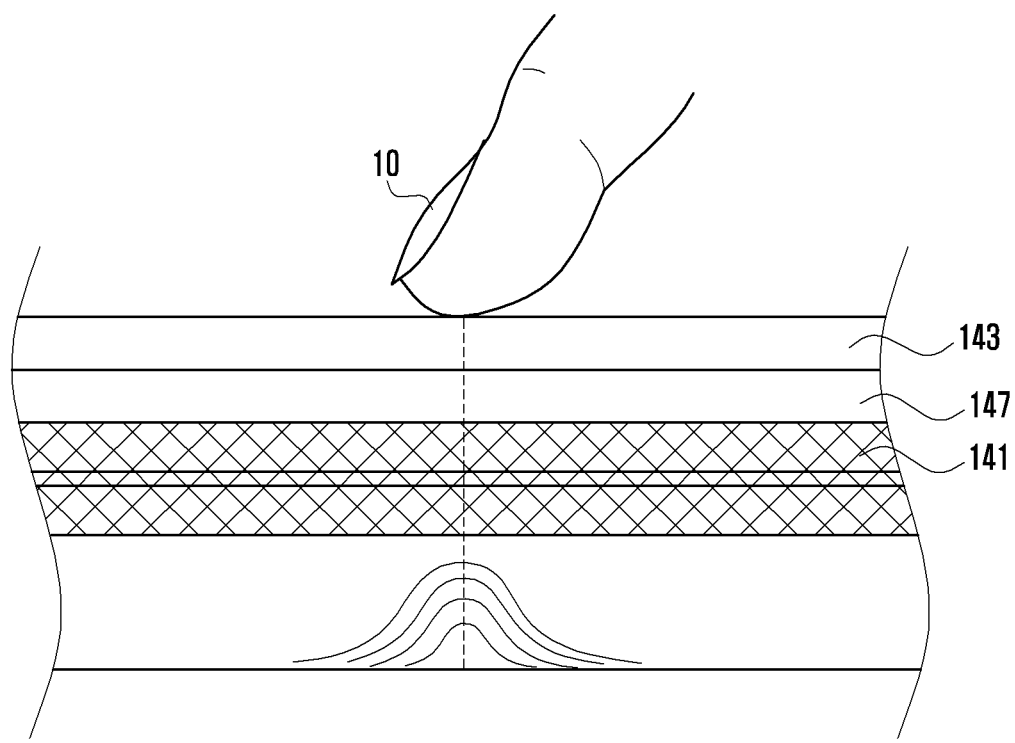
FIG. 4 is a cross-sectional view schematically illustrating a state of normal touch pressing on the display unit according to an embodiment of the present disclosure.
Figure 5:
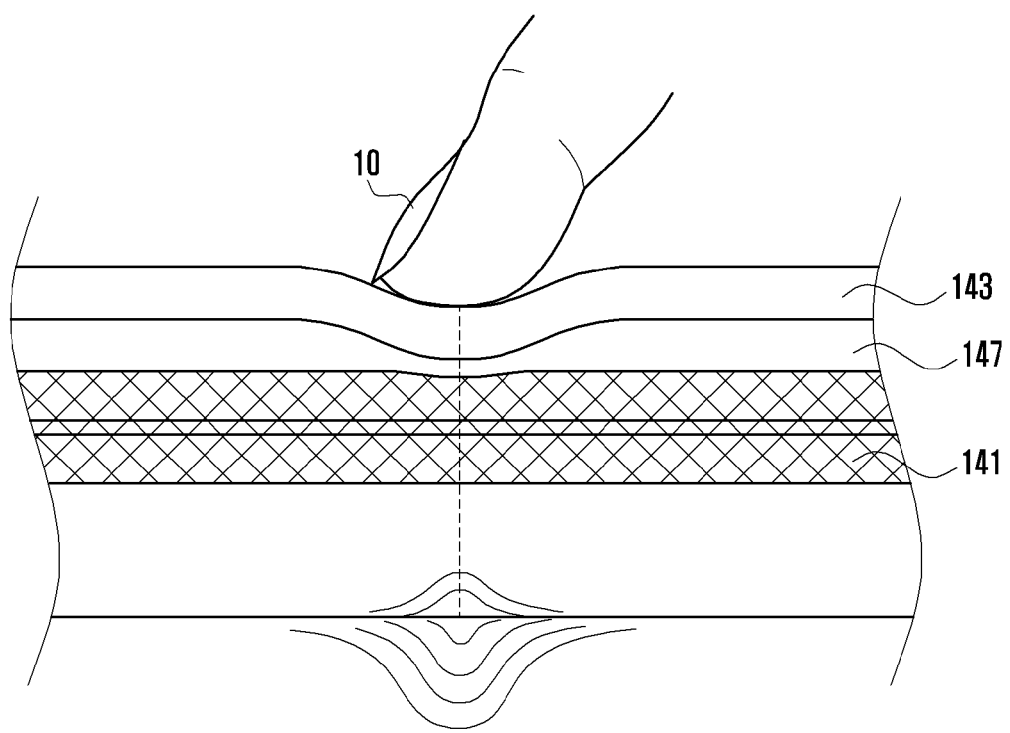
FIG. 5 is a cross-sectional view schematically illustrating a state of abnormal touch pressing on the display unit according to an embodiment of the present disclosure.

FIG. 1 is a perspective view schematically illustrating an external appearance of an electronic device according to an embodiment of the present disclosure. FIG. 2 is an exploded perspective view schematically illustrating a display unit and a control unit shown in FIG. 1 and related elements according to an embodiment of the present disclosure. FIG. 3 is a block diagram illustrating a configuration of an electronic device according to an embodiment of the present disclosure. FIG. 4 is a cross-sectional view schematically illustrating a state of normal touch pressing on the display unit according to an embodiment of the present disclosure. FIG. 5 is a cross-sectional view schematically illustrating a state of abnormal touch pressing on the display unit according to an embodiment of the present disclosure.

Referring to FIGS. 1 to 3, the electronic device 100 includes a communication unit 110, an input unit 120, an audio processing unit 130, a display unit 140, a memory unit 150, and a control unit 160. The display unit 140 includes a display panel 141 and a touch panel 143. Additionally, the electronic device 100 further includes a touch panel controller 145 for controlling the touch panel 143, a printed circuit board 161 for mounting the control unit 160 thereon, and a case 170 for embedding the above elements therein. Even though a display panel controller for controlling the display panel 141 may be provided separately, the display panel controller in this embodiment is incorporated in the control unit 160. If the display panel controller is provided separately, the display panel controller may control the output of various images to the display panel 141 under the control of the control unit 160 and, particularly, may support the output of a compensated image for improving image distortion. Also, the electronic device 100 may refresh information outputted on the display unit 140 independently from the output of a compensated image. Any adhesive layer 147 may be interposed between the display panel 141 and the touch panel 143. Both the input unit 120 and the touch panel 143 may act as input elements of the electronic device 100.

When a touching object 10 such as user's finger comes in contact with a certain spot 11 on the display unit 140, the electronic device 100 having the above-listed elements detects the type of touch pressure from the contact spot 11 through the touch panel 143. Thereafter, depending on the detected type of touch pressure, the electronic device 100 performs at least one of outputting compensated images by curing image distortion and outputting an alerting message.

The communication unit 110 may establish a communication channel with another device through a suitable network in order to support a communication function of the electronic device 100 or form a communication channel with a specific server that provides a particular web service. If the electronic device 100 has no communication function, the communication unit 110 may be removed from the electronic device 100. Meanwhile, in order to support a mobile communication function, the communication unit 110 may be provided in the form of a mobile communication module. For example, the communication unit 110 may establish at least one of a voice service channel, a video service channel, and a data service channel, and support transmission/reception of signals through a selected service channel. The electronic device 100 may output various screens associated with user functions performed through the communication unit 110. For example, for the operation of a call function based on the communication unit 110, the electronic device 100 may offer a dial selection screen, a phonebook search screen, and the like such that a user can select an item from such a screen. Also, the control unit 160 of the electronic device 100 may specially manage abnormal touch pressing that may occur in connection with each function related to the communication unit 110.

The input unit 120 is an element that creates various input signals required for the operation of the electronic device 100. Depending on compatibility of the electronic device 100, the input unit 120 may employ at least one of several input elements, such as a keyboard, a keypad, key buttons, and the like. In some embodiments, the input unit 120 may be realized in the form of a virtual touch map displayed on the display panel 141. The input unit 120 may create an input signal for on-off toggling of a specific mode that supports an image distortion compensation function of the present disclosure. If the image distortion compensation function supporting mode is turned on, the control unit 160 may provide at least one of an icon, an indicator, a message, a popup window, and the like for indicating the activation of the mode.

The audio processing unit 130 may output audio data created during the operation of the electronic device 100, audio data associated with the playback of audio files stored in the memory unit 150, audio data received from external entities, or the like. Additionally, the audio processing unit 130 may support an audio data collecting function. For this, the audio processing unit 130 may have a speaker (SPK) and a microphone (MIC). Particularly, the audio processing unit 130 may output a predefined alerting sound, a predefined sound effect, or a predefined vibration when any abnormal touch pressing occurs. If the mode of supporting the image distortion compensation function is turned off or if such output is set to be inactivated, the output of an alerting sound, a sound effect, or a vibration may be omitted.

The display unit 140 is an element that offers various screens required for the operation of the device 100. For example, the display unit 140 may offer an idle screen, a menu screen, a memo or email writing screen, a webpage screen, or the like. The display unit 140 may have the display panel 141 and the touch panel 143.

The touch panel 143 may be formed as a capacitive type, for example, and create a touch event by reacting with the touching object 10 such as a user's finger that causes variations in capacitance. The touch panel 143 may be disposed on the display panel 141. When the touching object 10 approaches the touch panel 143 within a given distance or comes in contact with the surface of the touch panel 143, a variation of capacitance may be caused in response to the proximity or contact of the touching object 10. Namely, as exemplarily shown in FIG. 4, a variation of capacitance occurs in the touch panel 143 when the touching object 10 approaches the touch panel 143. From such a variation of capacitance, the touch panel controller 145 may detect location values of the contact spot 11 by the touching object 10. The touch panel controller 145 may scan the touch panel 143 in a regular cycle to check whether there is a variation of capacitance in the touch panel 143. Then the touch panel controller 145 may collect location information about the contact spot 11 and transmit the location information to the control unit 160.

Meanwhile, if the touching object 10 excessively presses the touch panel 143 as exemplarily shown in FIG. 5, namely if abnormal touch pressing occurs, the touch panel 143 is partially bent at a pressed spot. This excessive touch pressure affects the display panel 141 through the adhesive layer 147, so that the display panel 141 is also partially bent at a pressed spot. Therefore, liquid crystal materials are dispersed along a perimeter of the pressed spot due to excessive touch pressure, and the thickness of the liquid crystal materials is relatively reduced at a pressed spot. Additionally, a variation in physical distribution of liquid crystal materials causes a change of orientation angle and also distorts transmitted light. As a result, transmission rate and direction of light may be changed, so that image distortion may occur. Further, excessive touch pressure may cause physical distortion of electrodes or of a color filter disposed in the display panel 141, thereby causing a light emitting mechanism starting from a backlight unit (not shown) to the front of the electronic device 100 from functioning properly.

In short, any physical distortion that occurs at a pressed spot of the display panel 141 produces optical distortion and therefore causes image distortion. In this process, capacitive type sensors disposed in the touch panel 143 are close to the display panel 141, so that capacitance by a current flowing in the display panel 141 may be varied. Namely, when physical distortion occurs due to abnormal touch pressing, abnormal distribution of capacitance is detected as shown in FIG. 5. The touch panel controller 145 may transmit, to the control unit 160, location information and any other information about such abnormal capacitance distribution.

The display panel 141 is disposed beneath the touch panel 143 with the adhesive layer 147 interposed there between. Normally the display panel 141 may include thin film transistors (not shown) that are arranged in a matrix form, pixel electrodes (not shown) that are connected to the thin film transistors, common electrodes (not shown) that face or adjoin the pixel electrodes so as to change electrical anisotropic characteristics of liquid crystal, a liquid crystal layer (not shown) that is disposed on the respective pixel electrodes, and a color filter layer (not shown) that is disposed on the liquid crystal layer. The display panel 141 passes or blocks the light emitted from the backlight unit to the color filter layer by using electrical anisotropic characteristics of liquid crystal, thus generating specific gradation. As discussed above, excessive touch pressure on a certain spot of the display panel 141 causes a thickness variation of the liquid crystal layer or physical distortion of such electrodes or of the color filter layer, thus causing image distortion. Accordingly, in embodiments of this present disclosure, the display panel 141 may support light emission corresponding to a compensated image assigned in advance to an abnormally pressed spot under the control of the control unit 160. Alternatively, the display panel 141 may refresh and output again currently displayed information under the control of the control unit 160. Through this refresh process, the electronic device 100 of this present disclosure may quickly restore distorted orientation of liquid crystal materials.

The memory unit 150 may store an operating system required for the operation of the electronic device 100 and various applications for various user function. Particularly, the memory unit 150 stores damage raw data 153 and a panel compensation program 151. The damage raw data 153 may be values of abnormal capacitance distribution detected due to abnormal touch pressing as shown in FIG. 5. Namely, the damage raw data 153 may have reverse-phased capacitance distribution in comparison with normal capacitance distribution. The damage raw data 153 may be values in a specific range or by stages. For example, the damage raw data 153 may have values of abnormal capacitance distribution by stages. The damage raw data 153 may be used as comparative criteria for determining whether capacitance distribution of the touch panel 143 is caused by normal or abnormal touch pressing.

The panel compensation program 151 may have routines designed to output a compensated image to a specific location at which a value of abnormal capacitance distribution corresponding to the damage raw data 153 is created in the touch panel 143. The panel compensation program 151 may have a plurality of compensated images and differently offer compensated images according to sizes of abnormal capacitance distribution values. For example, if any value of abnormal capacitance distribution corresponds to the first stage value of the damage raw data 153, the panel compensation program 151 may be designed to produce the first compensated image to a corresponding location. In another example, if any value of abnormal capacitance distribution corresponds to the second stage value of the damage raw data 153 greater than the first stage value, the panel compensation program 151 may be designed to produce the second compensated image at a corresponding location. In this case, the second compensated image may be greater in a distortion compensating ratio or in a distortion compensating range than the first compensated image.

Additionally, the panel compensation program 151 may have a routine designed to accumulate the occurrence frequency of abnormal touch pressing with regard to each particular user function and to offer a related alert in a specific cycle. Therefore, a user can be aware how often abnormal touch pressing occurs during the use of each user function. This may result in user's careful manipulation.

The control unit 160 is an element that performs various control processes required for the operation of the electronic device 100. Particularly, when abnormal capacitance distribution corresponding to abnormal touch pressing occurs in the touch panel 143, the control unit 160 may detect such occurrence by using the damage raw data 153 and then control the output of a relevant compensated image to the occurrence spot of the display panel 141. In this process, the control unit 160 may differently offer such a compensated image according to a size of the abnormal touch pressing.

Meanwhile, when a value of abnormal capacitance distribution caused by abnormal touch pressing is received from the touch panel controller 145, the control unit 160 may output an alerting message to the display panel 141 or output an alerting sound to the audio processing unit 130. Also, the control unit 160 may support accumulating the occurrence of abnormal touch pressing with regard to each particular user function and outputting list information about such occurrence to the display panel 141 in a specific cycle. In this case, with regard to a particular user function for which abnormal touch pressing occurs more frequently than a few given times, the control unit 160 may support the output of alerting information regarding accumulated abnormal touch pressing at a specific time point corresponding to the given times.

Figure 6:
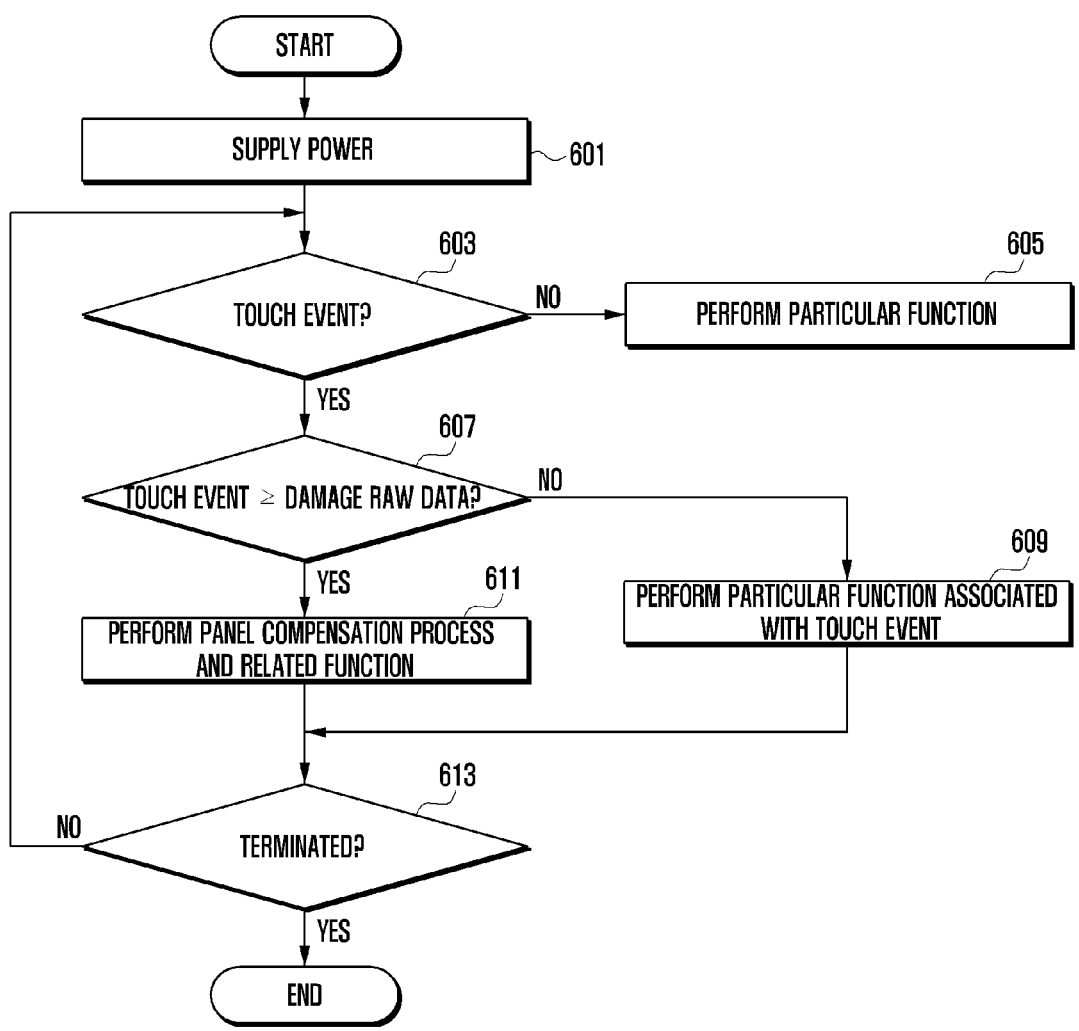
FIG. 6 is a flow diagram illustrating a method for operating an electronic device based on touch pressure according to an embodiment of the present disclosure.

FIG. 6 is a flow diagram illustrating a method for operating an electronic device based on touch pressure according to an embodiment of the present disclosure.

Referring to FIG. 6, at operation 601, the control unit 160 supplies electric power to each element of the electronic device 100. When any input event occurs, the control unit 160 checks at operation 603 whether the input event corresponds to a touch event. If the input event does not correspond to a touch event, the control unit 160 may perform at operation 605 a particular function associated with the input event. For example, if the input event is an incoming call, the control unit 160 may perform a function to inform a user of the incoming call. In another example, if the input event is the adjustment of a volume key, the control unit 160 may perform a function to adjust the volume of audio data.

Meanwhile, if the input event corresponds to a touch event at operation 603, the control unit 160 determines at operation 607 whether a value of capacitance distribution caused by the touch event is equal to or greater than the damage raw data 153. If such a value is smaller than the damage raw data 153, the control unit 160 performs at operation 609 a particular function associated with the touch event. For example, the control unit 160 may activate a selected user function in response to the touch event or operate an activated user function in response to the touch event.

If a value of capacitance distribution caused by the touch event is equal to or greater than the damage raw data 153 at operation 607, the control unit 160 performs at operation 611 a panel compensation process and any related function. Alternatively or additionally, at operation 611, the control unit 160 may support outputting at least one of an alerting message, an alerting sound, and an alerting vibration for abnormal touch pressing without performing a panel compensation process. For a panel compensation process, the control unit 160 may support outputting a predefined compensated image to a specific spot of the display panel 141 at which abnormal touch pressing occurs. Additionally, in spite of abnormal touch pressing, the control unit 160 may perform a particular user function associated with the touch event. Namely, the control unit 160 may activate a selected user function in response to the touch event or operate an activated user function in response to the touch event.

Thereafter, the control unit 160 checks at operation 613 whether an input event for terminating a function of the electronic device 100 is received. If there is no input event for termination, the control unit 160 returns to operation 603.

FIG. 7 shows screenshots illustrating the operation of an electronic device based on touch pressure according to an embodiment of the present disclosure.

Referring to FIG. 7, once electric power is supplied, the electronic device 100 may output a predefined screen containing specific menu items to the display unit 140 according to a predefined schedule or user's manipulation as shown in screenshot 701. When a user selects one of menu items displayed on the display unit 140, the contact spot 11 is determined on the display unit 140. If this touch event occurring at the contact spot 11 has a value of specific characteristics exceeding a predefined value, e.g., the predefined damage raw data, the control unit 160 may control a displaying of a predefined screen as shown in screenshots 703 and 705. The aforesaid characteristics of the touch event may be, for example, capacitance distribution and varied according to the characteristics of the touch panel 143. Similarly, the data raw data may be, for example, a given value of abnormal capacitance distribution.

In case where abnormal capacitance distribution occurs, the control unit 160 may support outputting a predefined alerting message 40 to the display unit 140 as shown in screenshot 703. Additionally or alternatively, the control unit 160 may support outputting audio data or vibration corresponding to the alerting message 40.

Alternatively, when abnormal capacitance distribution occurs, the control unit 160 may identify the location of a touched spot and then control the display panel 141 to display a predefined compensated image 12 at the touched spot as shown in screenshot 705. The compensated image 12 may be a predefined image in which image distortion is cured by compensating for a thickness variation of the liquid crystal layer or physical distortion of the color filter layer. The compensated image 12 may be experimentally detected and defined according to various occurrences of abnormal touch pressing and characteristics of the display panel 141. Namely, an unfavorable phenomenon such as the spread of color or the discoloration may be varied in shape or size according to abnormal touch pressing since the thickness of the liquid crystal layer or the structural parameters of the display panel 141 may be varied according to the characteristics of the display panel 141. Therefore, the compensated image 12 may be designed for image distortion compensation on the basis of experimentally obtained results for specific type and size of the display panel 141. Also, as mentioned above, the compensated image 12 may be differently designed by stages depending on sizes of abnormal touch pressing.

Meanwhile, in some embodiments of this present disclosure, the control unit 160 may not only apply the alerting message 40, etc. as shown in screenshot 703, but also apply the compensated image 12 as shown in screenshot 705.

Although the above-discussed embodiment focuses on the detection of abnormal touch pressing through abnormal capacitance distribution in the capacitive type touch panel 143, this is exemplary only and not to be considered as a limitation of the present disclosure. Alternatively, the electronic device 100 of this present disclosure may be designed to have pressure sensors (not shown) disposed in the display unit 140 to detect abnormal touch pressing from the display unit 140. To detect the abnormal touch pressing, the pressure sensors may be arranged in a matrix form. When any touch occurs at a certain spot on the display unit 140, some of the pressure sensors can detect touch pressure transmitted through media such as glass constituting the display unit 140. If the detected pressure is more than predefined damage raw data, the electronic device 100 determines that a currently occurring touch is caused by abnormal touch pressing, and then performs at least one of outputting an alerting message, etc. and outputting a compensated image. In this case, the damage raw data may be defined using particular pressure and force units such as a specific Pascal as a unit of pressure or a specific Newton as a unit of force.

As fully discussed above, the present disclosure allows detecting any excessive touch pressure on the display unit 140, warning of such excessive touch pressure, and compensating for the distortion of images caused by the excessive touch pressure.

According to a digital convergence tendency today, the above-discussed electronic device 100 may essentially or selectively further include any other elements such as a short-range communication module, a wired or wireless communication interface, an Internet communication module, a digital broadcast receiving module, and the like. Meanwhile, as will be understood by those skilled in the art, some of the above-mentioned elements in the electronic device 100 may be omitted or replaced with another.

The electronic device 100 according to various embodiments of this present disclosure may be applied to various types of mobile communication terminals such as a cellular phone, a smart phone, a tablet PC, a handheld PC, a Portable Multimedia Player (PMP), a Personal Digital Assistant (PDA), a notebook, a portable game console, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device based on touch pressure, the method comprising:
   determining the touch pressure caused by a touch occurring on a display unit;
   comparing the touch pressure with predefined damage data;
   determining whether the touch pressure is an abnormal touch pressure based on a result of the comparing of the touch pressure with the predefined damage data;
   performing a predefined specific process when the touch pressure is determined to be the abnormal touch pressure,
   wherein the performing of the predefined process includes:
      outputting a compensated image to a specific location of the display unit at which the abnormal touch pressure is exerted, and
   wherein the compensated image reduces distortion of the specific location, and
   when the touch pressure is determined to be a normal pressure, not outputting the compensated image.

2. The method of claim 1, wherein the outputting of the compensated image includes outputting the compensated image differently by stages according to a size of the abnormal touch pressure.

3. The method of claim 1,
   wherein the determining of the touch pressure includes collecting pressure values from pressure sensors arranged in a matrix form in the display unit, and
   wherein the damage data includes a predefined pressure value.

4. The method of claim 1, further comprising:
   performing a function associated with the touch.

5. The method of claim 1, wherein the performing of the predefined process includes at least one of:
   outputting at least one of an alerting message, an alerting sound, and an alerting vibration which indicate that the touch pressure is determined to be the abnormal touch pressure.

6. The method of claim 1, wherein the comparing of the touch pressure with the predefined damage data includes comparing a capacitance distribution of a touch panel constituting the display unit with predefined values of the predefined damage data.

7. The method of claim 6, wherein the comparing of the touch pressure with the predefined damage data includes checking whether the capacitance distribution of the touch panel is one of an abnormal capacitance distribution according to the predefined damage data and a reverse-phased capacitance distribution in comparison with a normal capacitance distribution.

8. The method of claim 6,
   wherein the predefined damage data includes abnormal capacitance distribution values by stages, and
   wherein the comparing of the touch pressure with the predefined damage data includes checking whether the capacitance distribution of the touch panel is in a specific stage of an abnormal capacitance distribution according to the damage data.

9. An electronic device for performing an operation based on touch pressure, the electronic device comprising:
   a display unit configured to obtain the touch pressure caused by a touch;
   a memory unit configured to store predefined damage data used for determining whether the touch pressure is an abnormal touch pressure; and
   a control unit configured to:
      compare the touch pressure with the predefined damage data,
      determine whether the touch pressure is the abnormal touch pressure based on a result of the comparing of the touch pressure with the predefined damage data,
      perform a predefined specific process when the touch pressure is determined to be the abnormal touch pressure, and
      output a compensated image to a specific location of the display unit at which the abnormal touch pressure is exerted,
   wherein outputting the compensated image reduces distortion of the specific location, and
   when the touch pressure is determined to be a normal pressure, not output the compensated image.

10. The electronic device of claim 9, wherein the control unit is further configured to output at least one of an alerting message, an alerting sound, and an alerting vibration which indicate that the touch pressure is determined to be the abnormal touch pressure.

11. The electronic device of claim 9, wherein the display unit is further configured to output the compensated image differently by stages according to a size of the abnormal touch pressure.

12. The electronic device of claim 9,
   wherein the electronic device further comprises a plurality of pressure sensors arranged in a matrix form in the display unit, and
   wherein the control unit is further configured to compare pressure values collected from the pressure sensors with a predefined pressure value.

13. The electronic device of claim 9, wherein the memory unit is further configured to store routines designed to output a compensated image to a specific location of the display unit at which a value of an abnormal capacitance distribution corresponding to the predefined damage data is exerted in the display unit.

14. The electronic device of claim 9, wherein the predefined damage data includes a value of an abnormal capacitance distribution of a touch panel constituting the display unit.

15. The electronic device of claim 14, wherein the control unit is further configured to check whether a capacitance distribution of the touch panel is one of the abnormal capacitance distribution according to the predefined damage data and a reverse-phased capacitance distribution in comparison with a normal capacitance distribution.

16. The electronic device of claim 14,
wherein the predefined damage data includes abnormal capacitance distribution values by stages, and
wherein the control unit is further configured to check whether a capacitance distribution of the touch panel is in a specific stage of the abnormal capacitance distribution according to the predefined damage data.

* * * * *